Sept. 3, 1929.  O. EISENHUT  1,726,547
RECOVERY OF REACTION PRODUCTS FROM GASES TREATED WITH ELECTRIC ARCS
Filed Dec. 29, 1926
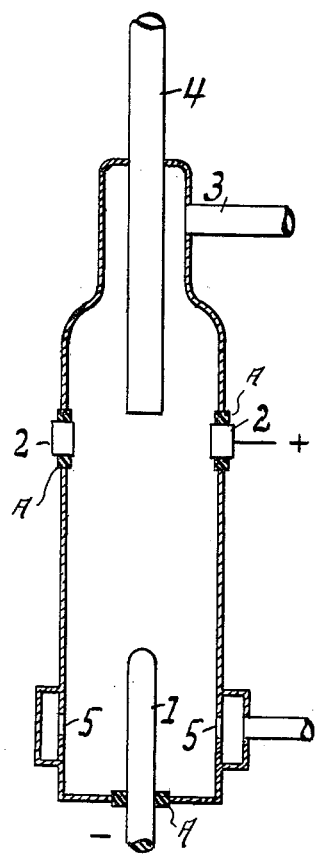
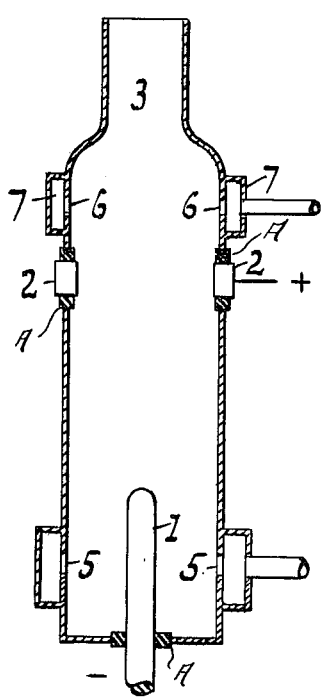
INVENTOR.
Otto Eisenhut
BY Hauff & Barland
ATTORNEYS.

Patented Sept. 3, 1929.

1,726,547

UNITED STATES PATENT OFFICE.

OTTO EISENHUT, OF HEIDELBERG, GERMANY, ASSIGNOR TO I. G. FARBENINDUSTRIE AKTIENGESELLSCHAFT, OF FRANKFORT-ON-THE-MAIN, GERMANY.

RECOVERY OF REACTION PRODUCTS FROM GASES TREATED WITH ELECTRIC ARCS.

Application filed December 29, 1926, Serial No. 157,787, and in Germany December 30, 1925.

I have discovered that, when gases are treated in electric arc furnaces, the space of which is not entirely filled by the electric discharge, the gases leaving the reaction vessel are not uniform, but contain different quantities of the desired reaction products in different portions of a cross-section of the discharge pipe. A uniform composition of the reaction gases is obtained only after the gases have passed a more or less considerable distance, the length of which depends on the shape of the pipes, the speed of the gas and various other influences.

According to the present invention the said discovery is utilized for facilitating the recovery of the reaction products from gases treated with electric arcs. For this purpose I arrange with the usual gas discharge passages or pipes one or more small outlet tubes or outlet openings so that they effect a separation of the gas portion rich in reaction products from that low in reaction products. The said small outlet tubes may be so arranged that they lead off the gas rich in reaction products or they may serve for the discharge of the poor gas leaving the rich gas in the main passage. The number of the said small outlet tubes and the places at which they are arranged, depend on the type of the electric arc furnace employed and on the result to be obtained. No specific directions can be given in this respect, but the nature of my said invention will be further illustrated by the following examples, reference being had to the accompanying drawing, but the invention is not limited to these examples.

*Example 1.*

An electric arc furnace is arranged as shown diagrammatically in vertical section in Figure 1 of the drawing. The arc is produced between the central cathode 1 and for example the annular anode 2 separated from each other by insulation A. The discharge pipe is provided, near the outlet of the gases from the said pipe, with another small outlet tube 4 arranged concentrically therein. Methane is introduced into the furnace in a tangential direction by suitable nozzles 5. The resulting gases, when discharged in the manner hitherto in use, by pipe 3 contain 2.5 per cent of acetylene. By means of the said small outlet tube 4, however, a gas containing from 4 to 6 per cent of acetylene or even more, depending on the width of the said tube, is obtained. When operating the furnace for example with a mixture of 14 per cent of methane and 86 per cent of hydrogen, such as may be formed for example in the stepwise conversion of methane into acetylene, the small outlet tube 4 effects the recovery of a gas containing about 7 per cent acetylene and about 93 per cent of hydrogen and thus the production of pure hydrogen by removal of the acetylene from this gas. When pure methane is introduced into the furnace in a straight line and not in a tangential direction, the small outlet tube 4 effects the withdrawal of a gas containing 8 per cent or even more of acetylene.

*Example 2.*

The discharge pipe 3 (see Figure 2) of an electric arc furnace similar to that described in Example 1 is provided, in the neighborhood of the reaction zone, with a number of fine, lateral openings 6 and means 7 for collecting and leading off the gases passing through said openings. When passing methane through the electric arc, the gas withdrawn by the fine openings 6 is practically free from acetylene, whereas the gas passing on through the discharge pipe 3 contains a considerably higher percentage in acetylene than in the case of an apparatus of the kind hitherto in use.

*Example 3.*

When operating an electric arc furnace with a flat arc provided with a concentrically arranged small outlet tube in the manner described in Example 1, with air, the small outlet tube effects the recovery of a gas mixture containing 5 per cent of nitrogen oxids, whereas without such tube all of the gas passed through the electric arc is obtained with only 2 per cent of nitrogen oxids.

I claim:

1. In the treatment of gases with an electric arc wherein the gas mixture leaving the arc is formed of a zone rich in the reaction product and a zone poor in said product, the step of separating from the resulting gas mixture the zone rich in the reaction product by suitably withdrawing one of said zones of the reaction gases.

2. In the treatment of gases in an electric arc the steps of passing a stream of said gases through said arc whereby the stream is split up into layers in the direction of flow one of which is rich in the desired product and the other of which is poor in the desired product, leading the gases away from the arc without disturbing the relation of said layers and then separating the said layers by drawing off one of them through a separate outlet.

3. In the discharge pipe of an electric arc furnace for heating gases the arrangement of small openings so located at points therealong that in reaching said openings the division of the discharge gas into a layer rich in the desired reaction product and a layer poor in said product has not been destroyed by a commingling of the two, said openings affording an exit for one of said layers whereby such layer is conducted away separately and a separation of the two layers is effected.

4. In the discharge pipe of an electric arc furnace for heating gases the arrangement of a small tube so located therein that in reaching the same the division of the discharge gas into a layer rich in the desired reaction product and a layer poor in said product has not been destroyed by a commingling of the two, said tube having its inner end located in one of said layers whereby such layer is conducted away separately and a separation of the two layers is effected.

In testimony whereof I have hereunto set my hand.

OTTO EISENHUT.